United States Patent [19]
Garconnet

[11] 4,131,039
[45] Dec. 26, 1978

[54] TIGHTENING FORCE LIMITING DEVICE

[76] Inventor: Michel J. Garconnet, 22 rue du Docteur Vitet, Saint Nicolas d'Aliermont, France

[21] Appl. No.: 764,948

[22] Filed: Feb. 2, 1977

[30] Foreign Application Priority Data
Feb. 3, 1976 [FR] France .................. 76 02985

[51] Int. Cl.² .................................................. B25B 23/14
[52] U.S. Cl. .................................. 81/52.4 R; 64/29; 192/46
[58] Field of Search ............ 81/52.4 R, 52.4 A; 192/46; 64/29

[56] References Cited

U.S. PATENT DOCUMENTS

| 2,400,818 | 5/1946 | Gallagher | 192/46 |
| 2,410,971 | 11/1946 | Hartley | 64/29 |
| 2,571,669 | 10/1951 | Boyce et al. | 64/29 |
| 3,228,209 | 1/1966 | Hersey | 64/29 |
| 3,667,250 | 6/1972 | Schnepel | 81/52.4 R |
| 3,838,567 | 10/1974 | Giger et al. | 192/46 |
| 3,889,490 | 6/1975 | Nadolny | 81/52.4 R |

Primary Examiner—James L. Jones, Jr.
Attorney, Agent, or Firm—Seidel, Gonda & Goldhammer

[57] ABSTRACT

The present invention relates to a tightening force limiting device comprising two end fittings, one of which can be connected to a tightening member and the other to the member to be tightened.

6 Claims, 8 Drawing Figures

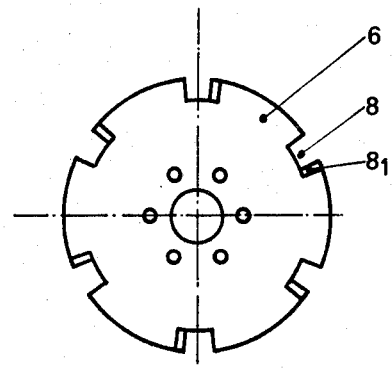
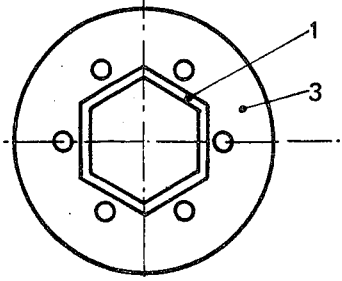
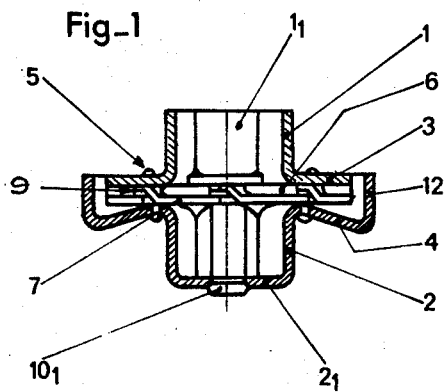
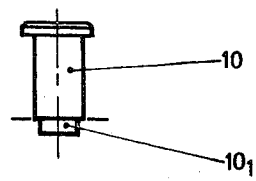
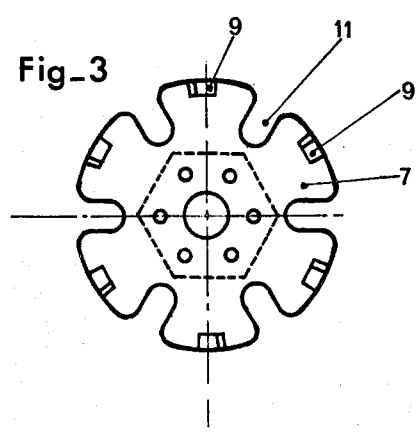
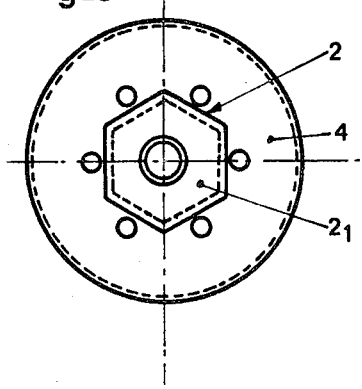
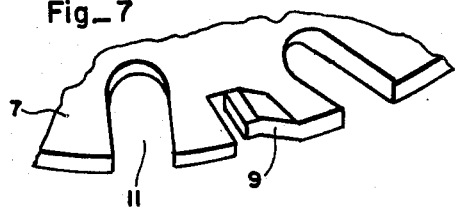
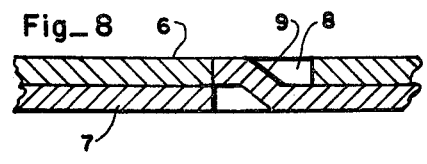

TIGHTENING FORCE LIMITING DEVICE

The present invention relates to a tightening force limiting device.

Devices for reducing the tightening force, for example of a nut, are already known, which comprise pinion reducing means and which make it possible to develop a large tightening or loosening force on the basis of a relatively small stress.

However, in view of the large reduction obtained by these devices it may happen during a tightening operation that the operator develops too large a force, resulting in damage to the member to be tightened and, for example, damage to the threads of a screw onto which a nut is to be tightened.

The present invention aims at obviating these disadvantages and to this end relates to a tightening force limiting device comprising two end fittings, one of which is connected to the tightening member and the other to the member to be tightened, characterised in that one of these end fittings is integral with a rigid disc provided with slots and the other of the end fittings is integral with a disc provided with tangentially directed spring steel tongues which are displaced from the plane of said disc, whereby said two discs, integral with their end fittings, are arranged coaxially relative to one another in such a way that the tongues penetrate the slots of the rigid disc.

According to another feature of the invention the tongues of the disc are made by half-cutting a spring steel disc.

According to another feature of the invention the spring steel disc has a radial slot between each half-cut tongue.

The invention is illustrated hereinafter relative to a non-limitative embodiment and with reference to the attached drawings, wherein show:

FIG. 1 is a cross-sectional view of the device according to the invention.

FIG. 2 an elevation of the slotted disc.

FIG. 3 an elevation of the disc provided with tongues.

FIG. 4 an elevation of the end fitting integral with the slotted disc.

FIG. 5 an elevation of the end fitting integral with the disc provided with tongues.

FIG. 6 a side view of the assembly axis.

FIG. 7 is a partial peripheral perspective view of one of the discs.

FIG. 8 is an enlarged sectional illustration of the mating discs shown in FIG. 1.

Therefore the object of the present invention is to provide a tightening force limiting device of simple construction and of very small overall dimensions in such a way that it can be easily fitted to a reducing device in order to prevent a too large tightening force developed by said reducing device causing damage to the tightening member.

The device according to the invention comprises two end fittings 1 and 2, one of which is to be connected to the member to be tightened and the other to the tightening member, constituted for example by a spanner or a lever arm.

In order to permit such a connection in the represented embodiment end fittings 1 and 2 have a hexagonal shape.

These end fittings are made hollow by stamping and cutting a rigid metal plate in such a way that end $1_1$ of one of the end fittings is open, whilst the end $2_1$ of the other end fitting is sealed.

In addition, said end fittings 1 and 2 have at their base a lateral flange 3 and 4 to which are fixed discs 6 and 7, for example by means of rivets 5.

Disc 6, integral with flange 3 of end fitting 1 is made from a rigid material and has slots 8 on its periphery.

Disc 7, integral with flange 4 of end fitting 2 is provided on its periphery with tangentially directed semi-cut tongues 9, which are displaced from the plane of disc 7 in such a way that they can be located within the slots 8 of disc 6.

The two discs 6 and 7 are arranged coaxially relative to one another via a pin 10, made for example in the form of a rivet and which is fixed by riveting its end $10_1$ into an axial orifice of corresponding dimensions made in the sealed end $2_1$ of end fitting 2.

This coaxial fitting of the two discs 6 and 7 to pin 10 permits the rotation of disc 6 relative to disc 7, said rotation of the two discs relative to one another being solely prevented by the elastic resistance of tongues 9 located in slots 8.

However, when the rotational force between the two end fittings 1 and 2 reaches a given value tongues 9, which have ramps inclined in the rotation, direction of the discs have a tendency to move aside and to be relocated in the plane of disc 7 in such a way that the two discs 6 and 7 can rotate relative to one another.

Consequently with the said device the two end fittings 1 and 2 are joined in rotation and permit the transmission of a tightening force until the torque developed becomes at least equal to the elastic resistance created by tongues 9. At this time these tongues move aside and disassemble the two end fittings 1 and 2 from one another.

It is also clear that in this device the limitation of the tightening phase only occurs in a single rotation direction corresponding to the inclination direction of the tongues 9. However, in the opposite rotation direction end $9_1$ of the said tongues abuts against one of the edges of slots 8 and thus makes it possible to develop a loosening force, without it being possible to produce a limitation through the disc connection in rotation of end fittings 1 and 2.

In the embodiment shown in the attached drawings edge $8_1$ of slot 8 which is applied to the displaced portion of tongues 9 is rounded, whilst disc 7 provided with tongues 9 has radial grooves or slots 11 located between each of said tongues. The function of this arrangement is to obtain a limitation of the tightening torque value to a constant value by rounded portion $8_1$ which can slide on the inclined edge of the tongues and by the improvement of the elasticity of disc 7, whose radial slots 11 permit it to co-operate more effectively during the disconnection of the two discs.

Furthermore these radial slots 11 made in disc 7 make it possible to obtain a more reliable device, in view of the fact that the limiting tightening force is determined by the sum of the elastic forces produced by tongues 9 and the radial strips formed between the slots.

In order to permit this curvature of the strips formed between the slots 11, flange 4 of end fitting 2 is made conical, whilst on the periphery of said flange 4 there is an annular portion 12 which is complementary to the casing of the limiting device.

Obviously the invention is not limited to the embodiments described and represented hereinbefore and various modifications can be made thereto without passing beyond the scope of the invention.

I claim:

1. A device for limiting tightening force comprising a pair of end fitting bodies, one of said end fitting bodies being adapted to connect to a tightening member and the other of said end fitting bodies being adapted to connect to a member to be tightened, a first disc having a plurality of slots, said first disc being fixedly connected to one of said end fitting bodies, a second disc of resilient material being fixedly secured to the other of said end fitting bodies, a plurality of inclined tongues extending from said second disc, said two discs being arranged coaxial to one another and each of the tongues of said second disc being received within one of the slots of said first disc for transmitting the tightening force between said end fitting bodies, said tongues being adapted to move out of said slots when the rotational force in one rotational direction exceeds a given value, and an assembly pin connected to one of said bodies, said pin extending through a central hole in said discs.

2. A device according to claim 1 wherein said inclined tongues are comprised of tangentially directed spring steel tongues and said tongues are displaced from a plane passing through the major face of said second disc.

3. A device according to claim 1 wherein said second disk is formed of spring steel and has a radially extending slot between each tongue.

4. A device according to claim 3 wherein said end fitting bodies each have a generally hollow sleeve portion and a flange extending from one of the ends of each sleeve portion, and one of said discs is secured to each flange.

5. A device according to claim 4 wherein one of said sleeves has an end sealed, said sealed end being opposite the end from which a flange extends, and said assembly pin extending axially from said sealed end and toward said discs.

6. A device according to claim 5 wherein the flange to which the second disc is secured has a generally conical shape.

* * * * *